(12) United States Patent
Smedley et al.

(10) Patent No.: US 6,249,108 B1
(45) Date of Patent: Jun. 19, 2001

(54) UNIFIED CONSTANT-FREQUENCY INTEGRATION CONTROL OF ACTIVE POWER FILTERS

(75) Inventors: Keyue M. Smedley, Irvine, CA (US); Luowei Zhou, Chongqing (CN)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/387,633

(22) Filed: Aug. 31, 1999

(51) Int. Cl.[7] ....................................................... G05F 1/70
(52) U.S. Cl. ............................................................. 323/207
(58) Field of Search ............................... 323/205, 207, 323/208, 209, 210; 363/97, 98, 131, 132

(56) References Cited

U.S. PATENT DOCUMENTS

| | | | |
|---|---|---|---|
| 5,519,306 | * | 5/1996 | Itoh et al. ............................... 323/222 |
| 5,751,138 | * | 5/1998 | Venkata et al. ......................... 323/207 |
| 6,108,221 | * | 8/2000 | Takada et al. ............................ 363/41 |

* cited by examiner

*Primary Examiner*—Matthew Nguyen
(74) *Attorney, Agent, or Firm*—Daniel L. Dawes, Esq.; Myers, Dawes & Andras LLP

(57) ABSTRACT

An switching converter (APF) is a device that is connected in parallel to and cancels the reactive and harmonic currents from a group of nonlinear loads so that the resulting total current drawn from the ac source is sinusoidal. What is provided is an unified constant-frequency integration (UCI) APF control method based on one-cycle control. This method employs an integrator to control the pulse width of an ac-dc converter so that its current draw is precisely opposite to the reactive and harmonic current draw of the nonlinear loads. In contrast to previously proposed methods, there is no need to generate a current reference for the control of the converter current, thus no need for a multiplier, and no need to sense the ac line voltage, the APF current, or the nonlinear load current. Only one current sensor and one voltage sensor are used to sense the ac source current and the dc capacitor voltage. The control method features carrier free, constant switching frequency operation, minimum reactive and harmonic current generation, and simple analog circuitry. It provides a low cost and high performance solution for power quality control. This control method is generalized to control a family of converters that are suitable for APF applications.

41 Claims, 12 Drawing Sheets

UNIFIED CONSTANT-FREQUENCY INTEGRATION CONTROL OF ACTIVE POWER FILTERS

BACKGROUND OF THE INVENTION

1. Field of the Invention

The invention relates to the field of active power filters and in particular to a control method based on one-cycle control.

2. Description of the Prior Art

In recent years, the usage of modem electronics equipment has been widely proliferating. This electronics equipment imposes nonlinear loads on the ac main or source that draw reactive and harmonic current in addition to active current. The reactive and harmonic current results in a low power factor, low efficiency, harmful electromagnetic interference to neighborhood appliances, as well as overheating of transformers. In order to solve these problems, many international agencies have proposed firm harmonic restrictions to electronic equipment. As a result, a vast number of power factor correction (PFC) techniques have been proposed to comply with these regulations.

Most techniques use a current shaper, whether in a two-stage multiple-switch configuration or a two-stage one-switch configuration, to shape the input current to a sinusoidal waveform. Since the current shaper is in the series path of the power, it requires high current and high voltage semiconductor devices and entails significant power losses. Therefore, PFC techniques are generally suitable for low to medium power applications. Furthermore, it is not convenient to insert a current shaper in existing electronic equipment, since significant redesign would be required. In high power applications, a parallel harmonic correction technique using an active power filter (APF) has been proposed and explored by many researchers. See, Fabiana Pottker and lov Barbi, "Power Factor Correction of Nonlinear Load Employing a Single Phase Active Power Filter: Control Strategy, Design Methodology and Experimentation" PESC 1997 Record 28$^{th}$ annual IEEE Power Electronics Specialists conference; D. A. Torrey, A Al-Zamel, "Single-phase active power filter for multiple nonlinear loads" IEEE Transactions on Power Electronics, Vol. 10, pp.263–271, May 1995; Simone Buso, Luigi Malesani, "Comparison of Current Control Techniques for Active Filter Applications" IEEE Trans on Industrial Electronics. Vol. 45. No. 5 October 1998; J.-C. Wu and H.-L. Jou "Simplified control method for the single-phase active power filter" IEE. Proc. Electr. power., Vol. 143, No. 3, May 1996; Hirofumi Akagi, "New trends in active filter for improving power quality" Proceeding of the 1996 International Conference on Power Electronics, Drives and Energy System for Industrial Growth; and J. Sebastian Tepper, Juan W. Dixon "A simple-frequency-independent method for calculating the reactive and harmonic current in a nonlinear load" IEEE Transaction on Industrial Electronics, Vol. 43, No. 6, December 1996.

An APF is a device that is connected in parallel to and cancels the reactive and harmonic currents from a group of nonlinear loads so that the resulting total current drawn from the ac source is sinusoidal. Ideally, the APF needs to generate just enough reactive and harmonic current to compensate the nonlinear loads in the line, thus it handles only a fraction of the total power to the load. Most APF control methods previously proposed need to sense the line voltage and the nonlinear load current, and then manipulate the information from these sensors to generate a current reference for the APF. Since the reference current has to reflect the load power of the nonlinear load, a multiplier is needed to scale the magnitude of the current reference. A control loop is necessary to control the converter to generate the reactive and harmonic current required by the nonlinear load. These functions are generally realized by a digital signal processing (DSP) chip with fast analog-to-digital (A/D) converters and high-speed calculations. The performance of these active power filters is based on three basic design criteria: the converter topologies, the control method used, and the method used to obtain the current reference. The complex circuitry results in high cost and unreliable systems, preventing this technique from practical applications.

What is needed is an API not subject to the inherent disadvantages of prior designs.

BRIEF SUMMARY OF THE INVENTION

The method of the invention is an unified constant-frequency integration (UCI) APF control method based on one-cycle control. It employs an integrator with reset as its core component to control the pulse width of an ac-dc converter so that its current draw is precisely opposite to the reactive and harmonic current draw of the nonlinear loads. The term, "reactive current", shall be defined in this specificaiton and claims to include all current which is different in phase or at a different frequency from the AC source current, including the fundamental frequency, all harmonics and other nonlinear effects of the load. In contrast to all previously proposed methods, there is no need to generate a current reference for the control of the converter current, thus no need to sense the ac line voltage, the APF current, and the nonlinear load current. Only one current sensor and one voltage sensor (resister divider) are used to sense the ac source current and the voltage across the dc capacitor. The control method features constant switching frequency operation, minimum reactive and harmonic current generation, and simple analog circuitry. It provides a low cost and high performance solution for power quality control.

More specifically the invention is defined as a circuit comprising an AC source, a nonlinear load coupled to the AC source in which the nonlinear load has a reactive current drawn therefrom, and an active power filter coupled to the AC source in parallel with the nonlinear load. The active power filter is configured so that it has a current draw opposite to the reactive current draw of the nonlinear load and so that the reactive current draw of the nonlinear load is substantially cancelled out by the current draw of the active power filter.

The compensation of multiple nonlinear loads coupled to the AC source is included within the scope of the invention. In such a case, the active power filter is coupled to the AC source in parallel with each of the nonlinear loads.

The active power filter comprises a switched bridge circuit and a storage device coupled to the switched bridge circuit. In the illustrated embodiment the storage device is a capacitor, and the switched bridge circuit is a switched full wave-bridge. In another embodiment, the switched bridge circuit is a switched half wave-bridge, or a switched DC side directional boost circuit.

In all of the embodiments, the switched bridge circuit switches at a higher frequency than is characteristic of operation of the AC source and than the nonlinear load. The capacitor is configured to have a nearly constant voltage waveform across switching cycles.

The circuit further comprises an integrator with a reset circuit. The integrator has an input coupled to the active power filter. The integrator with the reset circuit has an output coupled to and controlling the switching of the active power filter. The integrator with the reset circuit is configured to control the switched bridge so that net current drawn from the AC source by the active power filter is equal to the fundamental active current drawn by the nonlinear load, and has substantially the same waveform and is in phase with the AC source.

In the illustrated embodiment, the active power filter comprises an AC to DC converter and a storage device coupled thereto having a control voltage, $v_c$. The AC to DC converter is switched at a frequency characterized by a duty cycle, D. The nonlinear load and the active power filter are characterizable as an equivalent resistance, $R_e$, which is coupled to the AC source. The AC source has a voltage, $v_s$, and current, $i_s$, and further comprises a sensing resistor, $R_s$, which is coupled in series with the equivalent resistance, $R_e$, and the AC source. The duty cycle, D, is controlled according to a control equation so that reactive and harmonic current of the nonlinear load is substantially cancelled. In one embodiment, such as a full wave bipolar converter, the control equation is $2Dv_m=v_m-R_s*i_s$, where $v_m=R_s v_c/R_e$. In another embodiment, such as a full wave unipolar converter, a half wave converter, and a current source converter, the control equation is $Dv_m=v_m-R_s*i_s$ where $v_m=R_s v_c/R_e$.

The invention is also defined as a method of performing the above defined operations of the foregoing circuit, Namely, the invention can be defined as a method of filtering an AC source having a nonlinear load coupled to the AC source having a reactive current drawn therefrom by use of an active power filter coupled to the AC source in parallel with the nonlinear load comprising the steps of drawing reactive current with the nonlinear load, and drawing current with the active power filter opposite to the reactive current draw of the nonlinear load. As a result the reactive current draw of the nonlinear load is substantially cancelled out by the current draw of the active power filter.

The invention may be better visualized by turning to the drawings, wherein like elements are referenced by like numbers.

The invention now having been illustrated in the foregoing drawings, the invention and its various embodiments as well as its generalization from the illustrated embodiment can be understood in the following detailed description.

DETAILED DESCRIPTION OF THE PREFERRED EMBODIMENTS

An Converter Topology

Figure 1:
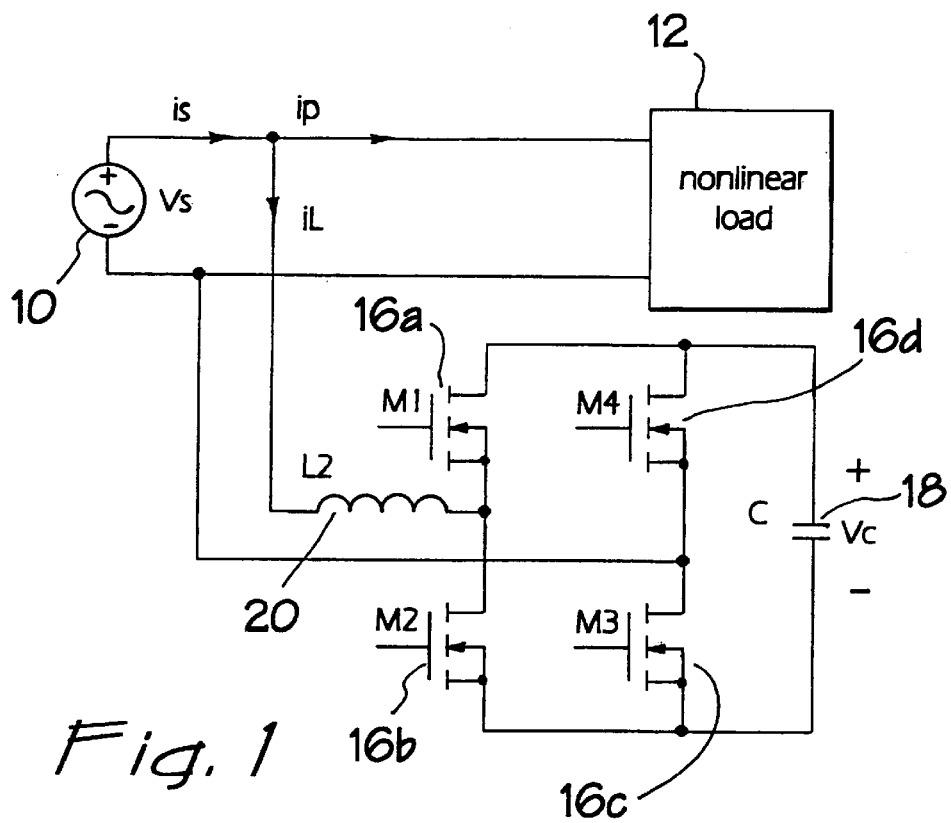
FIG. 1 is a schematic diagram which shows a shunt active power filter in parallel with a nonlinear load.

FIG. 1 shows a shunt active power filter 14 coupled to a power source 10 in parallel with a nonlinear load 12. In reality, it is possible to have multiple nonlinear loads 12 in parallel. The power stage is composed of a current bidirectional H-bridge comprised of FET's 16a–16d and an energy storage capacitor 18 at the dc side. H-bridge 16a–16d is operated as a voltage-source converter that converts the dc voltage on energy storage capacitor 18 to an ac voltage to the line. H-bridge 16a–16d is controlled at the gates of Fets 16a–16d by logic or clock signals conventionally generated in accordance with the teachings set forth herein of the present invention. H-bridge 16a–16d can also be viewed as a boost converter from the viewpoint of dc capacitor 18. The task of H-bridge 16a–16d is to provide the reactive and harmonic current required by the nonlinear load,12 so that the net current draws from the ac source gives the fundamental active power used at nonlinear load 12.

In order to realize a good compensation of the reactive and harmonic current to nonlinear load 12 at any point in one line cycle, the capacitor voltage must be greater than the peak of ac voltage. In the steady state, the capacitor voltage should be constant from one line cycle to another, since H-bridge 16a–16d only processes the reactive power. H-bridge 16a–16d is operated at switching frequency of $f_s$. There are two switching states in each switching cycle, i.e. Fets 16a and 16d are on and Fets 16b and 16c are off during 0<t<DTs; and Fets 16a and 16d are off and Fets 16b and 16c are on during DTs<t<Ts, where t is time, Ts=1/fs is the switching period and $D=T_{on}/T_s$ is the duty ratio.

Figure 2C:
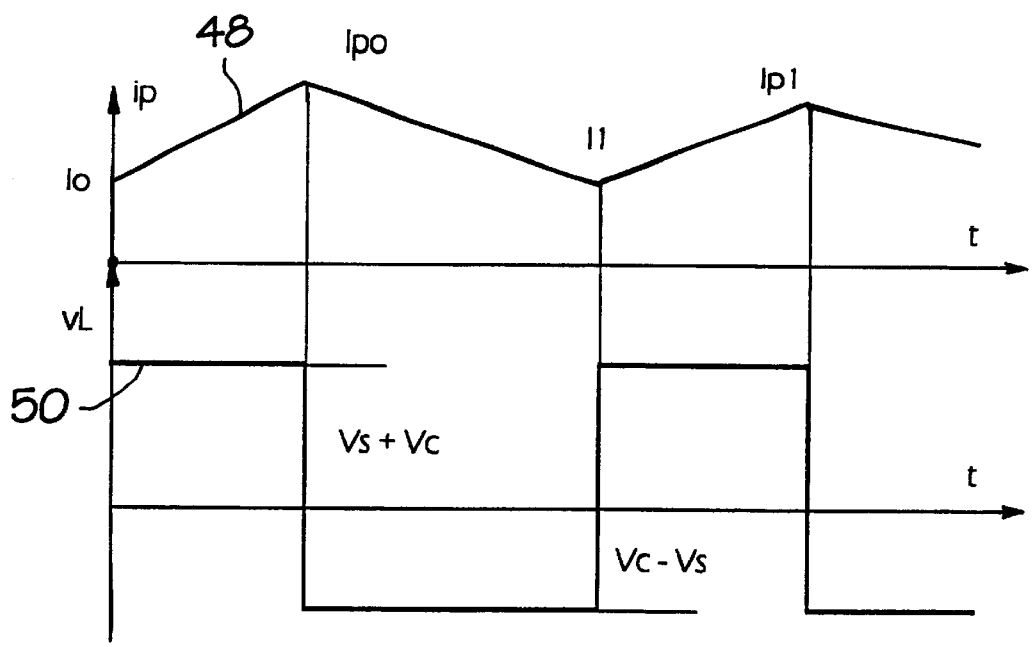
FIG. 2(c) is a graph of the inductor current and voltage as a function of time of the circuit of FIG. 1.
Figure 2A:
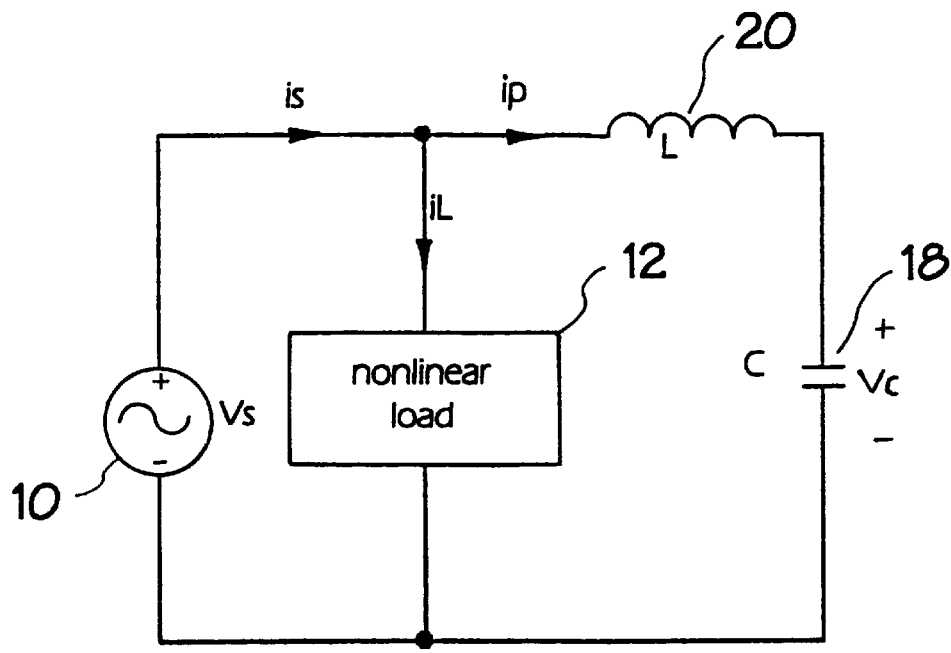
FIG. 2(a) is a schematic of an equivalent circuit of FIG. 1 when 0<t<DT.
Figure 2B:
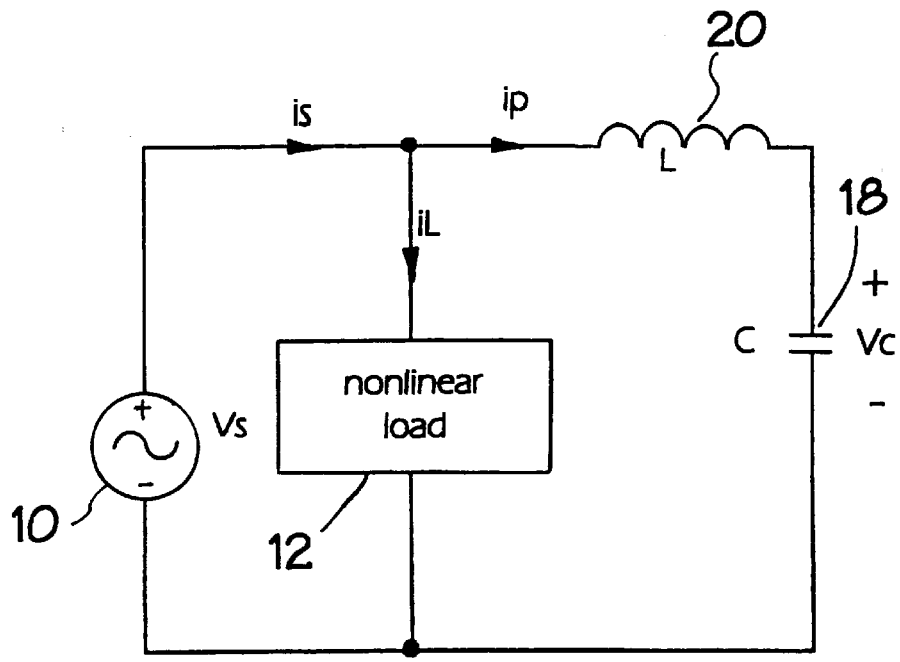
FIG. 2(b) is a schematic of an equivalent circuit of FIG. 1 when DTs<t<Ts.

The equivalent circuits of the converter during 0<t<DT and DTs<t<Ts are shown in FIGS. 2(a) and 2(b). To simplify the analysis, it is assumed that: (1) the value of energy storage capacitor 18 is large enough so that its voltage Vc has a nearly constant waveform from one switching cycle to the next; and (2) the switching frequency fs is much higher than both the line frequency and the frequency of nonlinear load current. FIG. 2(c) is a timing diagram of the waveforms in the circuit of FIGS. 2(a) and 2(b). Graph 48 is the current drawn by the APF as a function of time, and graph 50 is the voltage across the APF or inductor 20 as a function of time. According to the waveform in FIG. 2(c), following equations are obtained.

During $0 \leq t \leq t_{on}$ $$i_L = \frac{v_s + v_c}{L_c} t + I_0 \tag{1}$$

$$v_L = v_s + v_c \tag{2}$$

During $t_{on} \leq t \leq T_s$ $$i_L = \frac{v_s - v_c}{L_c} t + I_{P0} \tag{3}$$

$$v_L = v_s - v_c \tag{4}$$

Where $v_s$ is the voltage on source 10, $v_c$ the voltage on capacitor 18, $L_c$ the inductance of inductor 20, $I_0$, the initial current, and $I_{po}$ the peak current. In practice, the initial value $I_0$ and the peak value $I_{po}$ of inductor current for each switching cycle can be different, i.e. $I_0$ may not be equal to $I_1$ and $I_{po}$ may not be equal to $I_{p1}$, which are the currents during the second cycle. However, according to the assumption #(1) above, the waveform of the load current is assumed to be almost unchanged between switching cycles, i.e. $I_0$ equals $I_1$ and $I_{po}$ equals $I_{p1}$. Using the voltage-second balance of an inductor in a one switch cycle in the steady state, $$(v_s + v_c)D = (v_c - v_s)(1-D) \tag{5}$$

The relationship between energy storage capacitor voltage and the ac source voltage is $$v_c = \frac{1}{1-2D} \cdot v_s \tag{6}$$

UCI Apf Control Method

Figure 3:
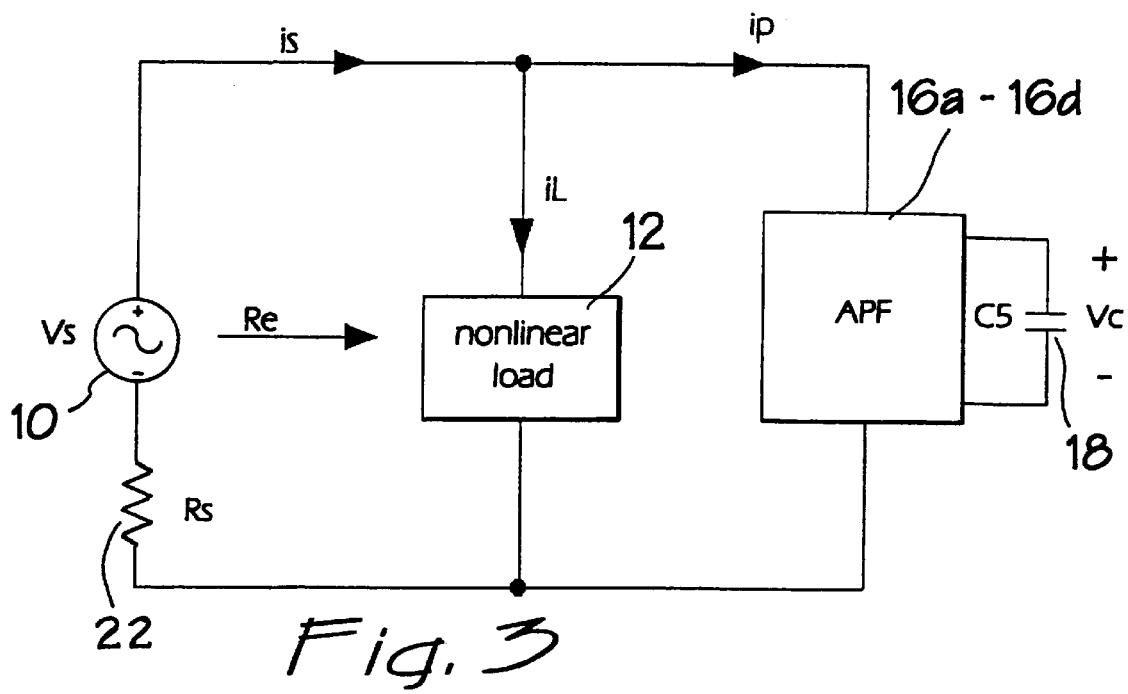
FIG. 3 is an equivalent circuit wherein a resistor, Re, is used to emulate a nonlinear load with an APF in parallel.

The object of controlling H-bridge 16a–16d is to provide the reactive and harmonic current required by nonlinear load 12, so that the net current draws from ac source 10 is the fundamental active power used at nonlinear load 12. From the viewpoint of ac source 10, nonlinear load 12 with an active power filter in parallel imposes a linear resistive load to the ac power system in the steady state. Therefore, an equivalent resistor $R_e$ is used to emulate nonlinear load 12 with an active power filter in parallel for ac source 10 as shown in FIG. 3. The control goal of APF is $$v_s = R_e * i_s \tag{7}$$

Combination of equation (6) and (7) with a current sensing resistor 22, $R_s$ yields the following equation $$\frac{R_s}{R_e}(1-2D) * v_c = R_s * i_s \tag{8}$$

Let $$v_m = \frac{R_s}{R_e} v_c \tag{9}$$

Then the control goal of active power filter becomes $$2Dv_m = v_m - R_s * i_s \tag{10}$$

In each switching cycle, if the duty ratio D is controlled to satisfy the equation (10), equation (7) is satisfied. In each line cycle, if the capacitor voltage is controlled to be constant from cycle to cycle, only the reactive power is processed in H-bridge 16a–16d. The net current drawn from ac source 10 is equal to the fundamental active current required by nonlinear load 12 and has the same waveform as and is in phase with the line voltage. The reactive and harmonic current of nonlinear load 12 is canceled from ac line current.

Figure 4:
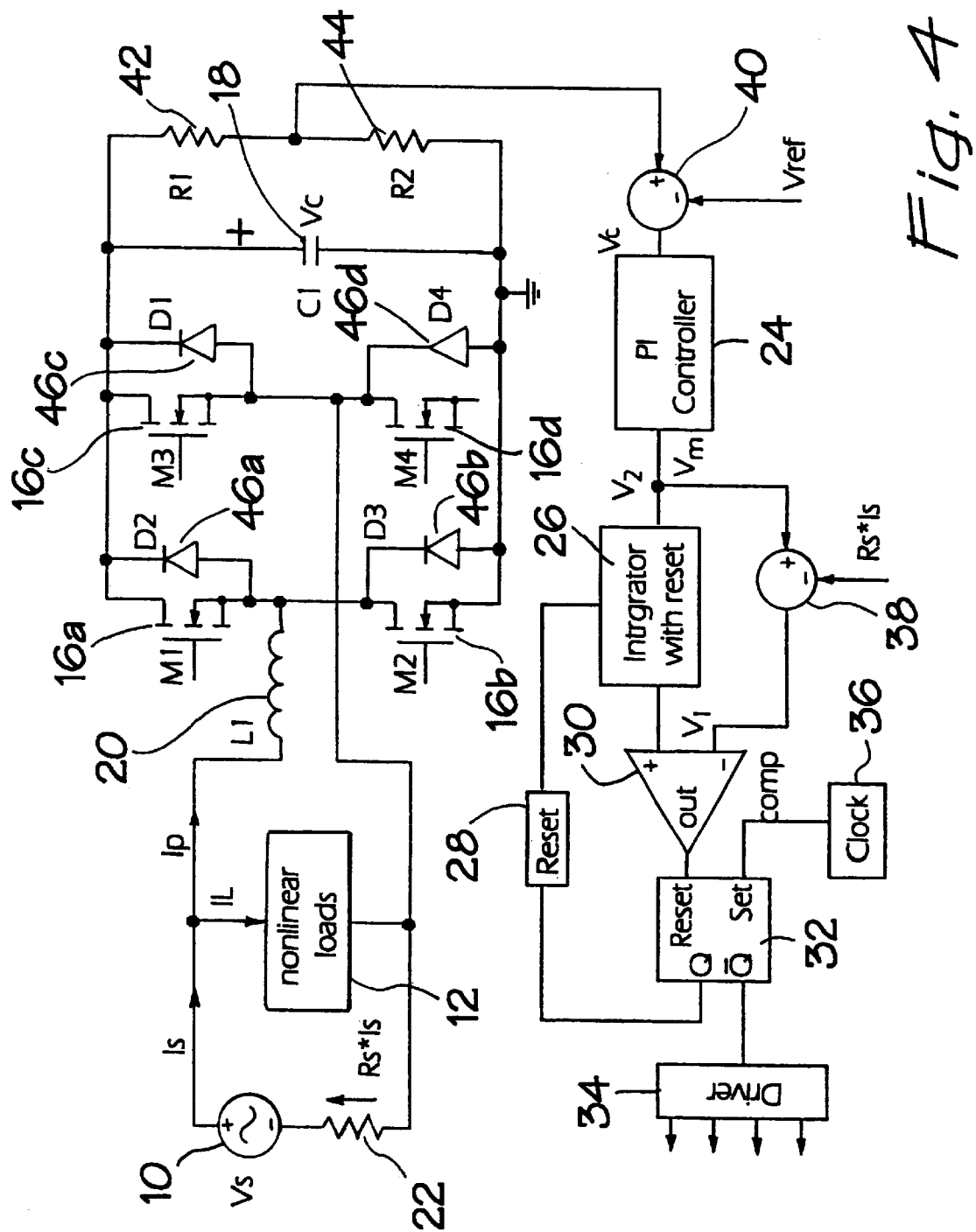
FIG. 4 is a schematic in partial block diagram form of an active power filter (APF) with an integration reset control according to the invention.

An one-cycle control based integrator with reset circuit is employed to realize equation (10) as shown in FIG. 4. For examples of one-cycle control in other contexts, see K. M. Smedley and S. Cuk "One cycle control of switching converters" in IEEE PESC, 1991 Record, PP1173–1180; and Z. Lai. K. M. Smedley. "A General Constant Frequency Pulse-Width Modulator and Its Applications". IEEE Transactions on Circuits and Systems I: Fundamental Theory And Applications, Vol. 45.(no. 4), IEEE, April, 1998, P386–96. Due to the assumption #(2) above, the $v_m$ can be considered unchanged in one switching cycle, thus $$\frac{1}{T_i} \int_0^{DT_s} v_m \cdot d \cdot t = \frac{1}{T_i} D \cdot T_s \cdot v_m \tag{11}$$

where $T_i$ is an integration constant and $T_s$ is switching period.

Let $$T_i = \frac{1}{2}T_s,$$

$$\frac{1}{T_i}\int_0^{DT} v_m \cdot d \cdot t = \frac{1}{T_i} \cdot D \cdot T_s \cdot v_m = 2 \cdot D \cdot v_m = v_m - R_s \cdot i_s \quad (12)$$

is satisfied in each switching cycle. According to the above derivation, the active power filter with the proposed controller is shown in FIG. 4. The control circuit contains a PI controller 24, an integrator 26 with a reset switch 28, a comparator 30, and a clocked flip-flop 32 clocked by clock 36. The capacitor voltage $v_c$ is sensed from resistance divider 42, 44 and fed to PI controller 24 through subtraction node 40 with a reference voltage, $V_{ref}$, and to generate an output of PI controller 24, the error voltage $v_m$. The input to integrator 26 is combined in a subtraction node 38 with $R_s *I_s$ and provided to the input of comparator 30 with the other input of comparator 30 being the error voltage, $v_m$. The object of PI controller 24 is to maintain the dc voltage of storage capacitor 18. The switches 16a and 16d, which are protected by shunting diodes 46a–46d respectively, are turned on by the clock pulse. Integrator 26 integrates the error voltage $v_m$, and the output of integrator 26 is compared with $(v_m-R_s \cdot i_s)$. When the integrated is value reaches $(v_m-R_s \cdot i_s)$, comparator 30 changes its output state and triggers flip/flop 32, which in turn turns off switches 16a and 16d, turns on switches 16a and 16c and resets integrator 26 by means of logic commands generated by driver 34 in response to flip-flop 32. This process repeats in every switching cycle. The control goal of equation (10) is thus realized.

Experimental Verification

Figure 5:
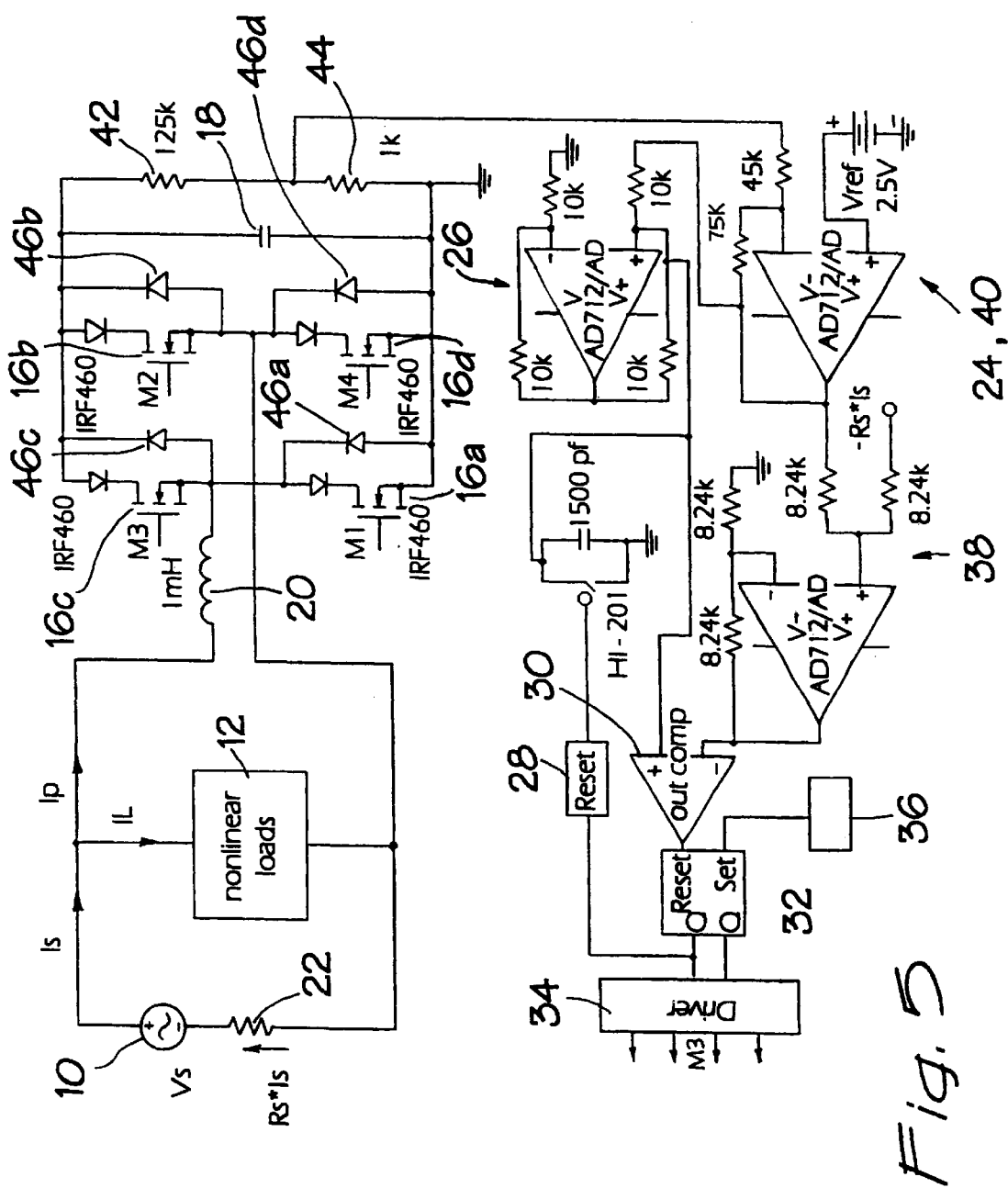
FIG. 5 is a schematic of a prototype circuit built to experimentally demonstrate the principles discussed in connection with the circuit of FIG. 4.

In order to verify the performance of the proposed control method, a single-phase active power filter prototype has been developed and tested in a 110V power system. The prototype circuit and component selection are shown in FIG. 5, which is set forth as an illustration and should not be considered as limiting the invention in any way. The power rating is 500 w and the switching frequency is 40 kHz.

Figure 6:
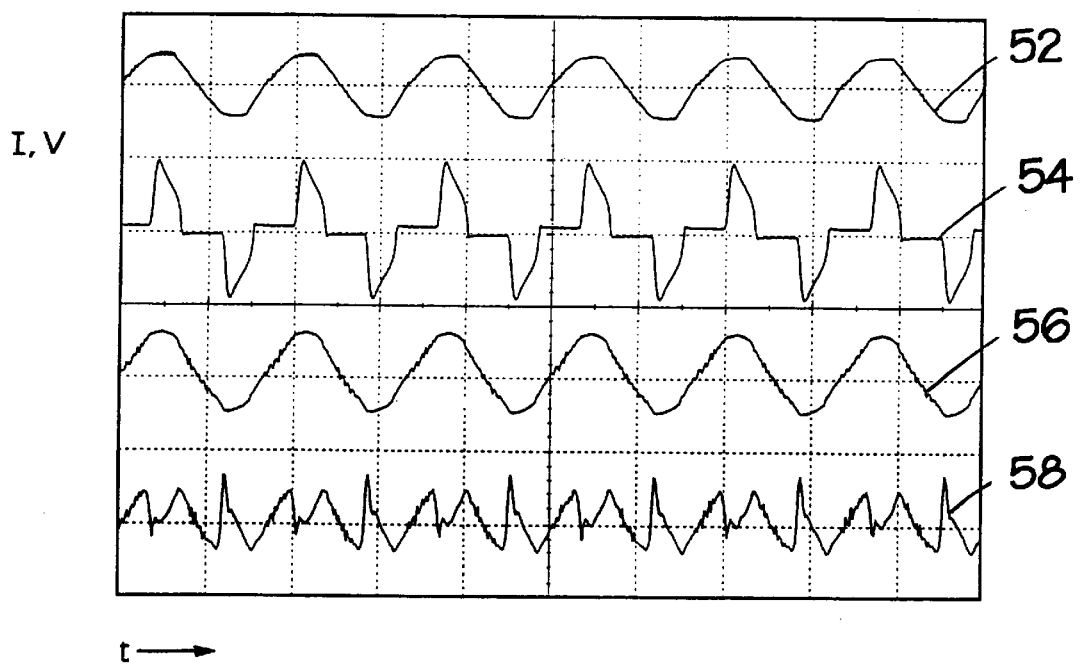
FIG. 6 is a graph as a function of time of the performance of the circuit of FIG. 5 in which a diode rectifier with an RC load is the nonlinear load. The uppermost trace is line voltage, the second trace from the top is input current of the uncontrolled rectifier, the third trace from the top is in line current after compensation by the APF, and the fourth trace from the top is the current draw of the APF.

Three kinds of different nonlinear loads were employed in the experimental tests. FIG. 6 is a graph shows the test results of the an active power filter compensating a diode rectifier with a RC load. The total harmonic distortion of the nonlinear load current considering up to the $20^{th}$ harmonic component is 78.437%. After compensated by the active power filter, the total harmonic distortion of the AC source current is 8.54%. The uppermost trace 52 is line voltage, the second trace 54 from the top is input current of the uncontrolled rectifier, the third trace 56 from the top is in line current after compensation by the APF, and the fourth trace 58 from the top is the current draw of the APF.

Figure 7:
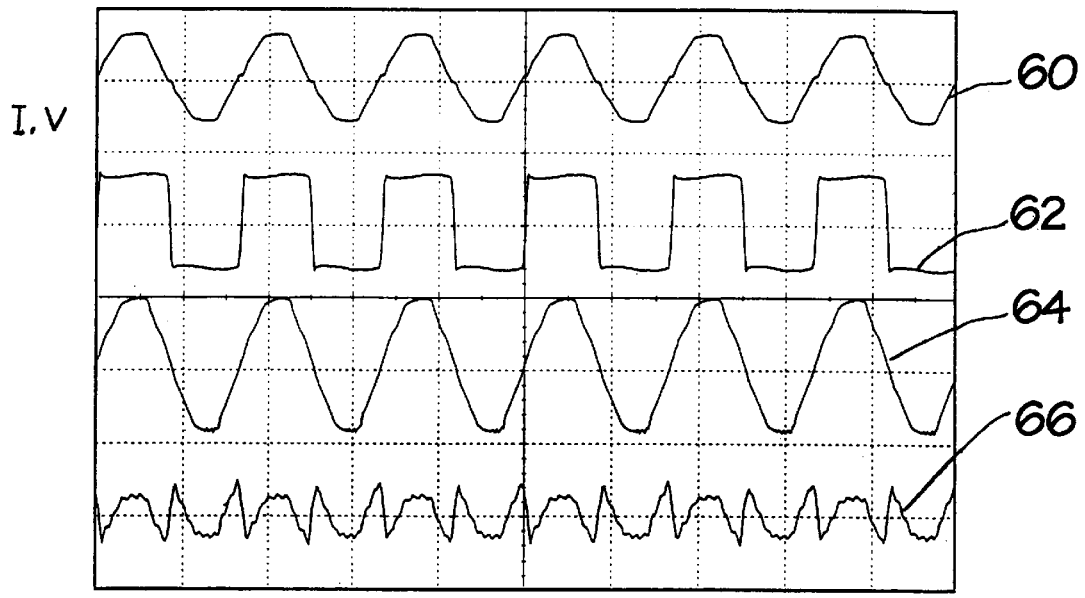
FIG. 7 is a graph as a function of time of the experimental results of the circuit of FIG. 5 in which the nonlinear load is a diode rectifier with RL load. The upper trace is the line voltage, second trace from the top is line current compensated by the APF, the third trace from the top is input current of uncontrolled rectifier, and the fourth trace from the top is current draw of the APF.

FIG. 7 presents the results of the active power filter compensating a diode rectifier with RL load. The upper trace 60 is the line voltage, second trace 62 from the top is line current compensated by the APF, the third trace 64 from the top is input current of uncontrolled rectifier, and the fourth trace 66 from the top is current draw of the APF. The total harmonic distortion of nonlinear load current is 44.231%. After compensated by the active power filter of FIG. 5, the total harmonic distortion of the AC source current is 6.893%. The circuit of FIG. 5 is one implemented form of the circuit of FIG. 4 and like elements have been referenced by like numerals.

Figure 8:
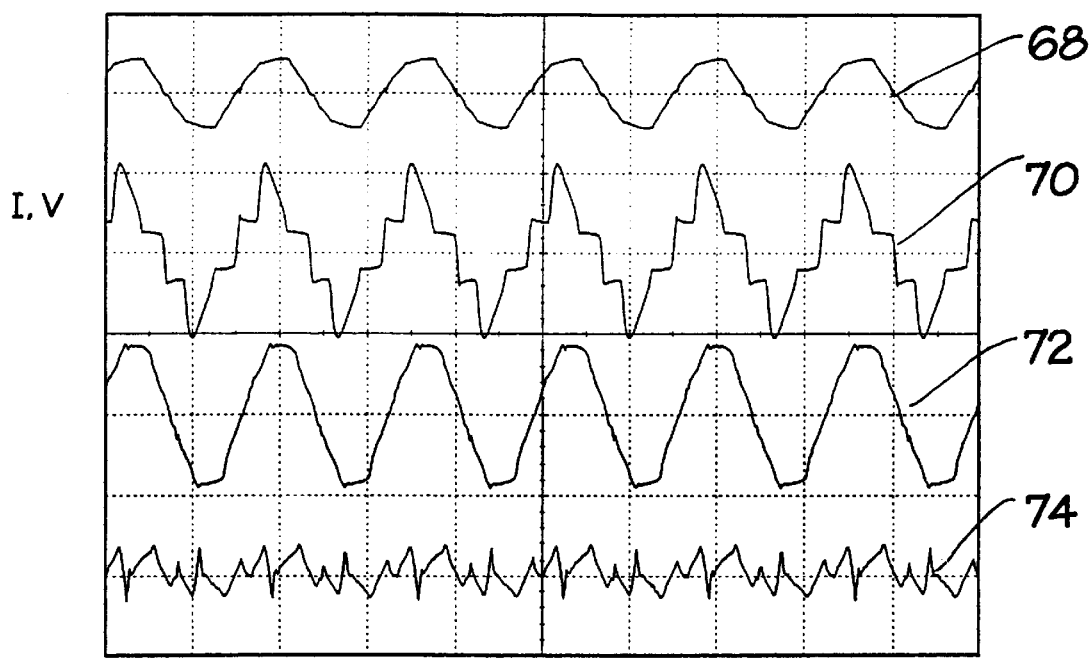
FIG. 8 is a graph as a function of time of the experimental results of proposed active power filter compensating multiple nonlinear loads, which consist of a diode rectifier with an RC filter and a diode rectifier with an RL load in parallel. The upper trace is the line voltage, second trace from the top is line current compensated by the APF, the third trace from the top is input current of uncontrolled rectifier, and the fourth trace from the top is current draw of the APF.

FIG. 8 shows the experimental results of the active power filter compensating multiple nonlinear loads, which consist of a diode rectifier with an RC filter and a diode rectifier with an RL load in parallel. The upper trace 68 is the line voltage, second trace 70 from the top is line current compensated by the APF, the third trace 72 from the top is input current of uncontrolled rectifier, and the fourth trace 74 from the top is current draw of the APF. The total harmonic distortion of total nonlinear load current is 36.33%. The total harmonic distortion of the AC source current compensated by the active power filter is 5.94%. Since the goal of control is to force the ac source current to follow the ac source voltage, the total harmonic distortion of the line current cannot be lower than that of the ac source voltage waveform. In the experiment above, the total harmonic distortion of AC source voltage is measured at 3.9%.

Figure 9:
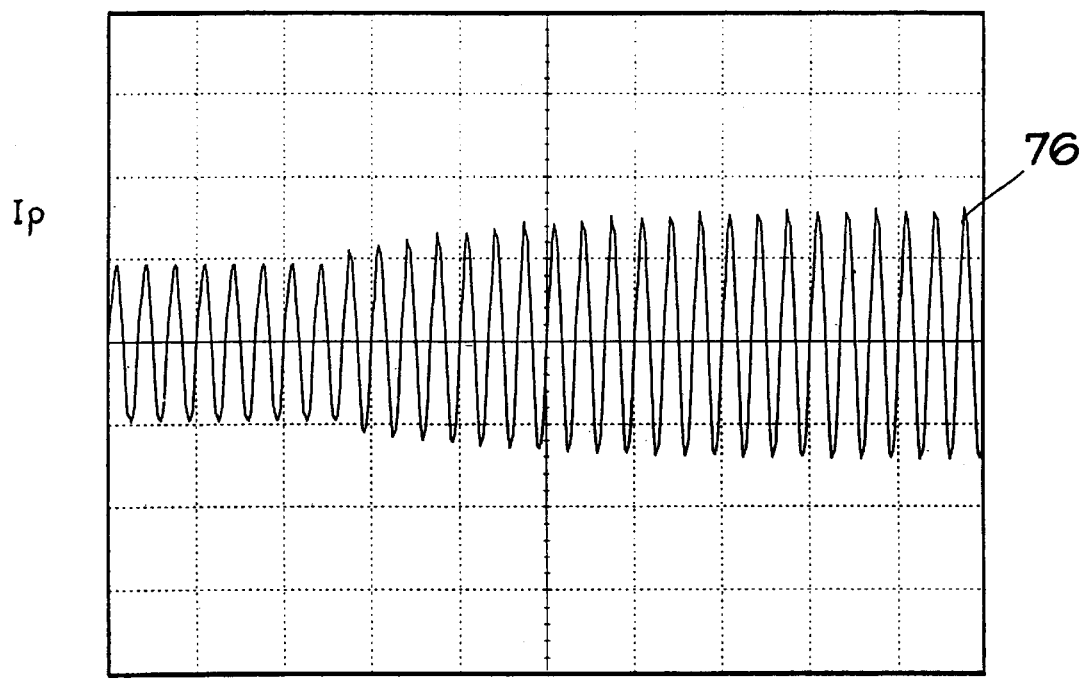
FIG. 9 is a graph as a function of time which shows the step response of an input AC current in which the active power filter compensates a diode rectifier with an RC load in the case where the load resistor, R, makes a step change.

Trace 76 of FIG. 9 shows the step response of an input AC current of the active power filter when compensating a diode rectifier with an RC load when the load resistor, R. discontinuously changes from 450Ω to 200Ω at t=0.

Figure 10:
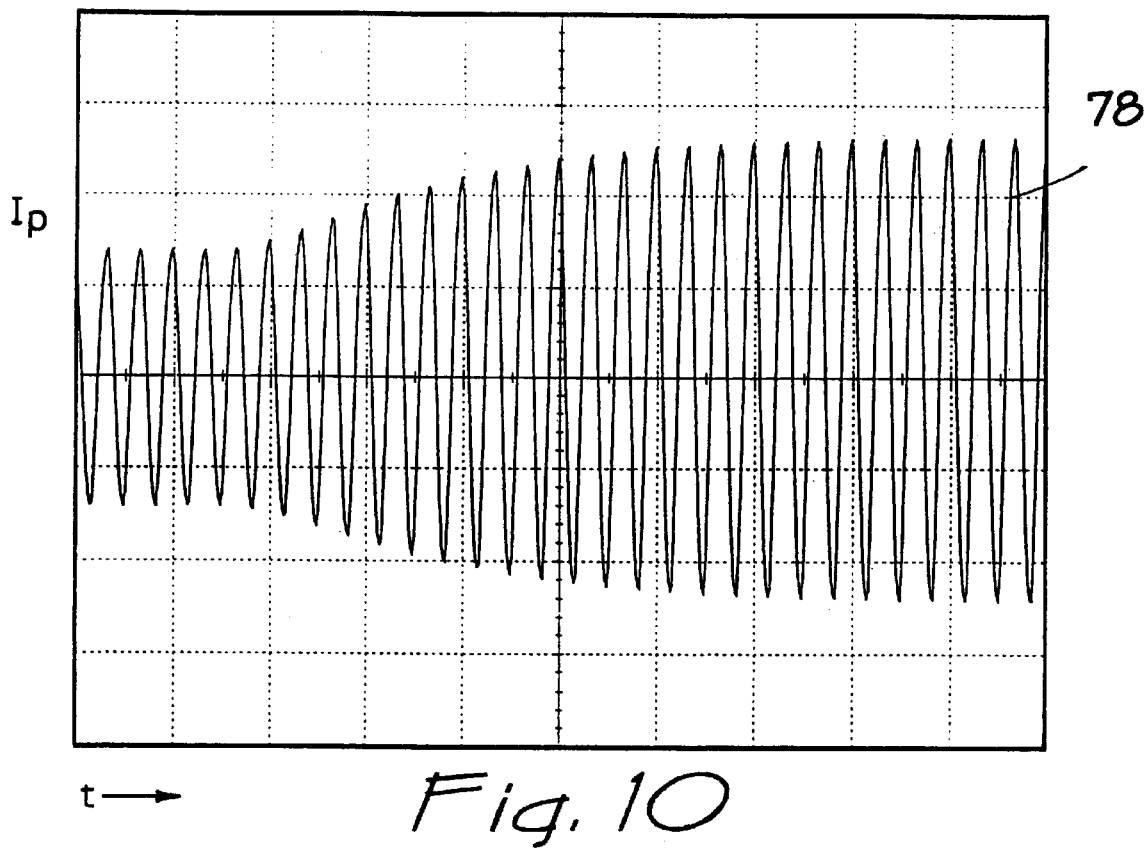
FIG. 10 is a graph which shows the step response of input AC current in the active power filter when compensating a diode rectifier with an RL load when the load resistor, R, discontinuously changes from 120Ω to 60Ω at t=0.

Trace 78 of FIG. 10 shows the step response of input AC current in the active power filter when compensating a diode rectifier with an RL load when the load resistor, R, discontinuously changes from 120Ω to 60Ω at t=0. It is observed that the APF acts as a filter to smooth the step change of load currents and keep the input current sinusoid during the transient. This characteristic is advantageous for an AC source.

Generalization

Figure 11A:
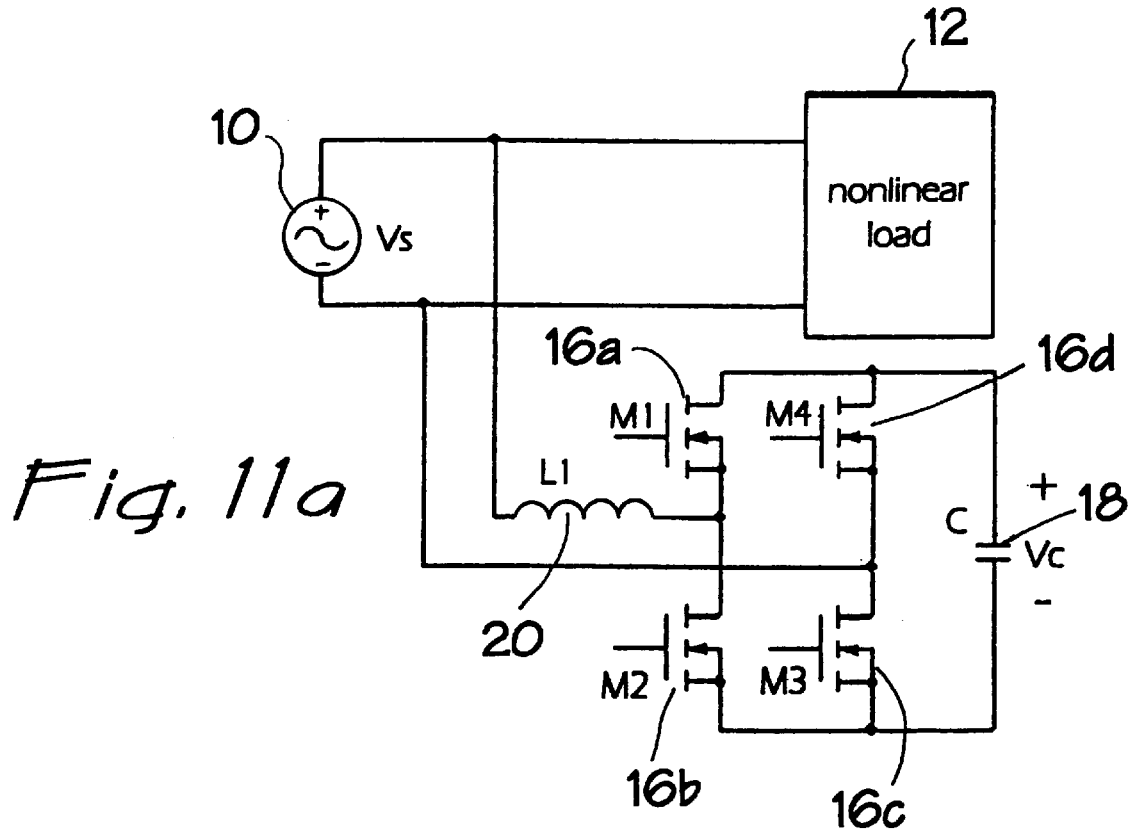
FIG. 11(a) is a schematic of a full-bridge voltage source converter operating in unipolar voltage mode in accordance with the invention.
Figure 11B:
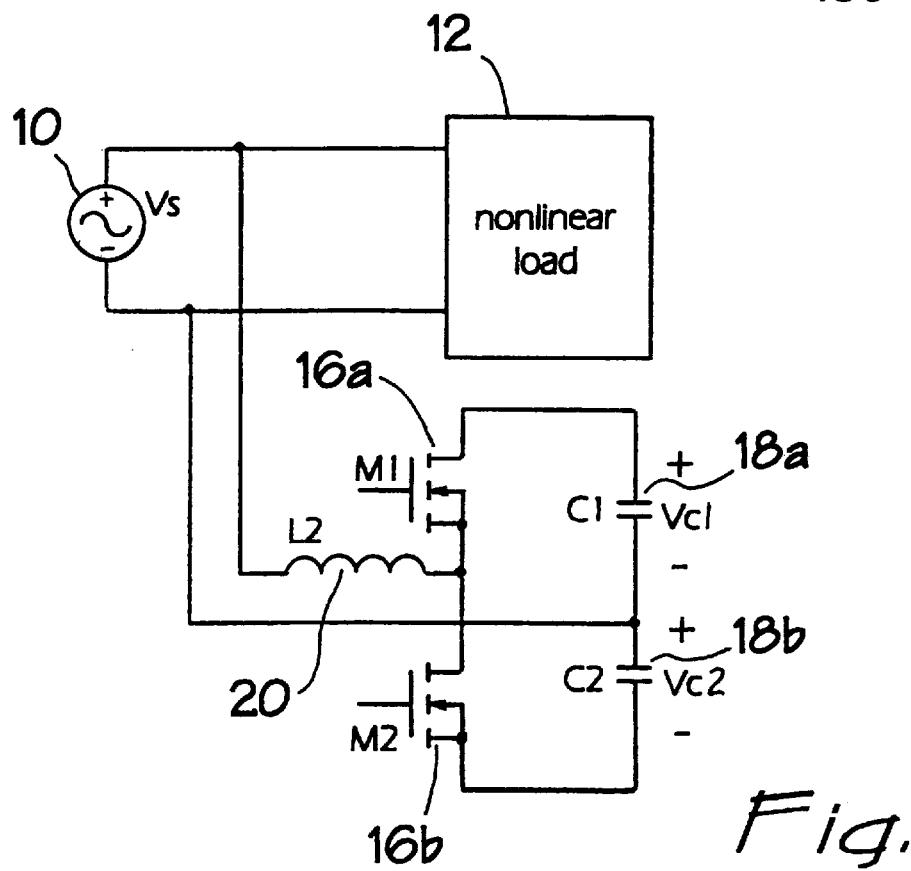
FIG. 11(b) is a schematic of a half bridge converter in accordance with the invention.
Figure 14:
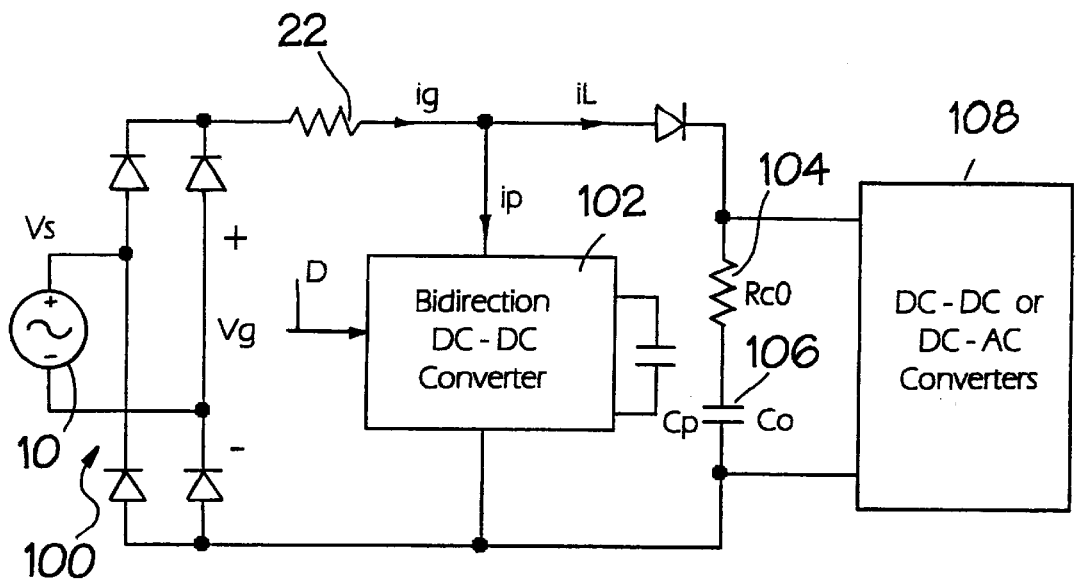
FIG. 14 is a schematic of a DC side APF or what is also called a shunt power factor correction circuit.

The APF control method of the invention can be extended to other power stages of the active power filters as shown in FIGS. 11(a), 11(b), and FIG. 14. In FIG. 11(a), the power stage has the same topology as the circuit shown in FIG. 5, but with a different operation mode. In the circuit shown in FIG. 5, the full bridge power stage operates in a bipolar voltage and bipolar current mode, while the full bridge shown in FIG. 11(a) operates in unipolar voltage and bipolar current mode. Two switches among the four operate at the line frequency while the other two switches operate at a high switching frequency, witch results in less switching loss. Table 1 below shows the switching states of switches 16a–16b in the mode of operation of FIG. 11(a). In this operational mode, the relationship between $V_s$ and $V_c$ is $$v_c = \frac{1}{1-D} \cdot |v_s|$$

and the control goal function becomes $Dv_m=v_m-R_s*i_s$.

Figure 12:
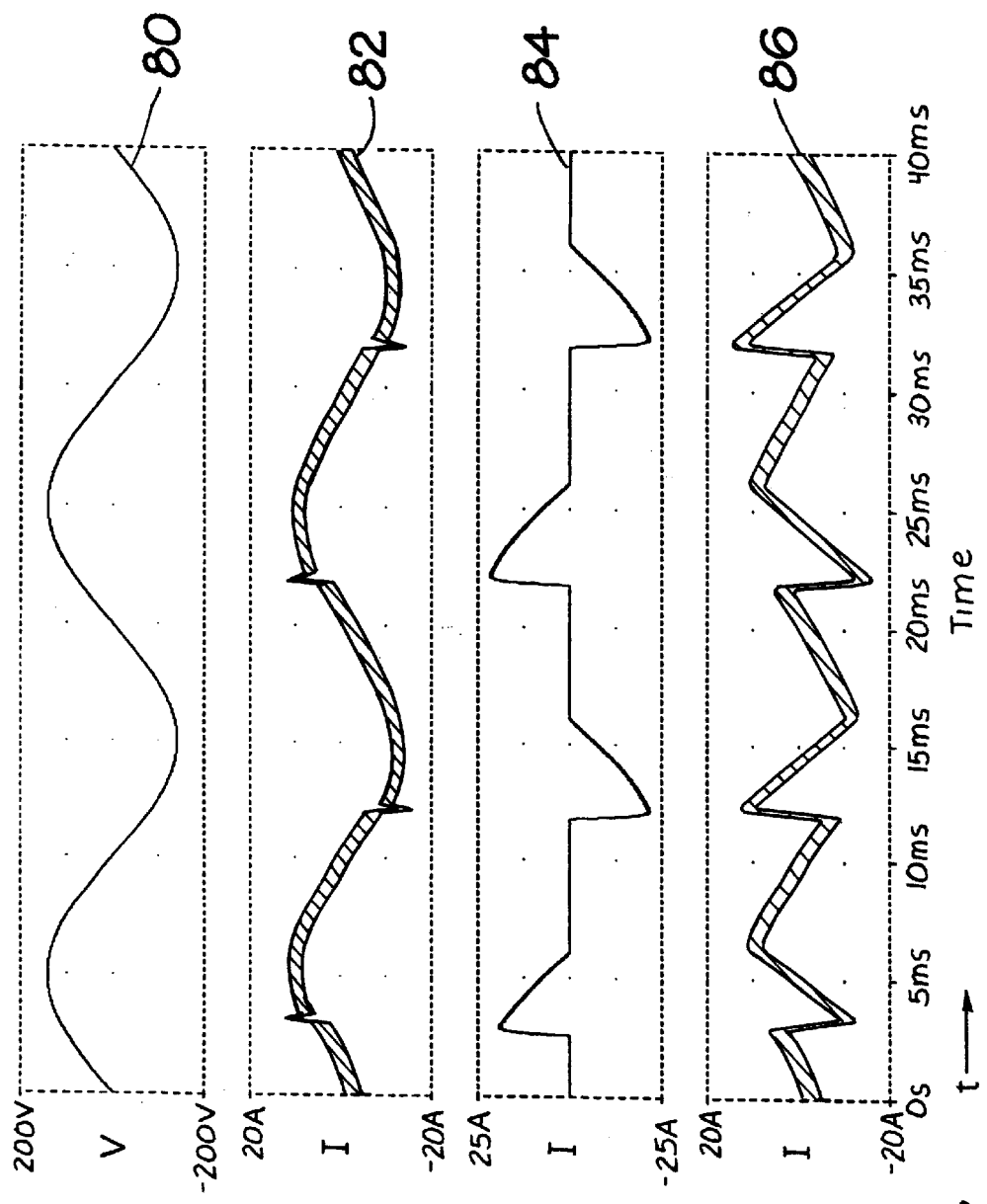
FIG. 12 is a graph of the simulation waveforms of the APF with a full bridge voltage source converter operating in unipolar voltage mode employing proposed control strategy as shown in FIG. 11(a).

FIG. 12 is a graph of the simulation waveforms of the APF with a full bridge voltage source converter operating in unipolar voltage mode employing proposed control strategy as shown in FIG. 11(a). The upper trace 80 is the line voltage. The second trace 82 from the top is the line current after compensated by the APF. The third trace 84 from the top is the current of the nonlinear loads. The fourth trace 86 from the top is the current draw of the APF.

TABLE 1

| Switches | Vs > 0 | Vs < 0 |
| --- | --- | --- |
| Fet 16a | Operating at $f_s$ and in complementary mode with Fet 16b | Off |
| Fet 16b | Operating at $f_s$ | On |
| Fet 16c | Off | Operating at $f_s$ and in complementary mode with Fet 16d |
| Fet 16d | on | Operating at $f_s$ |

Figure 13:
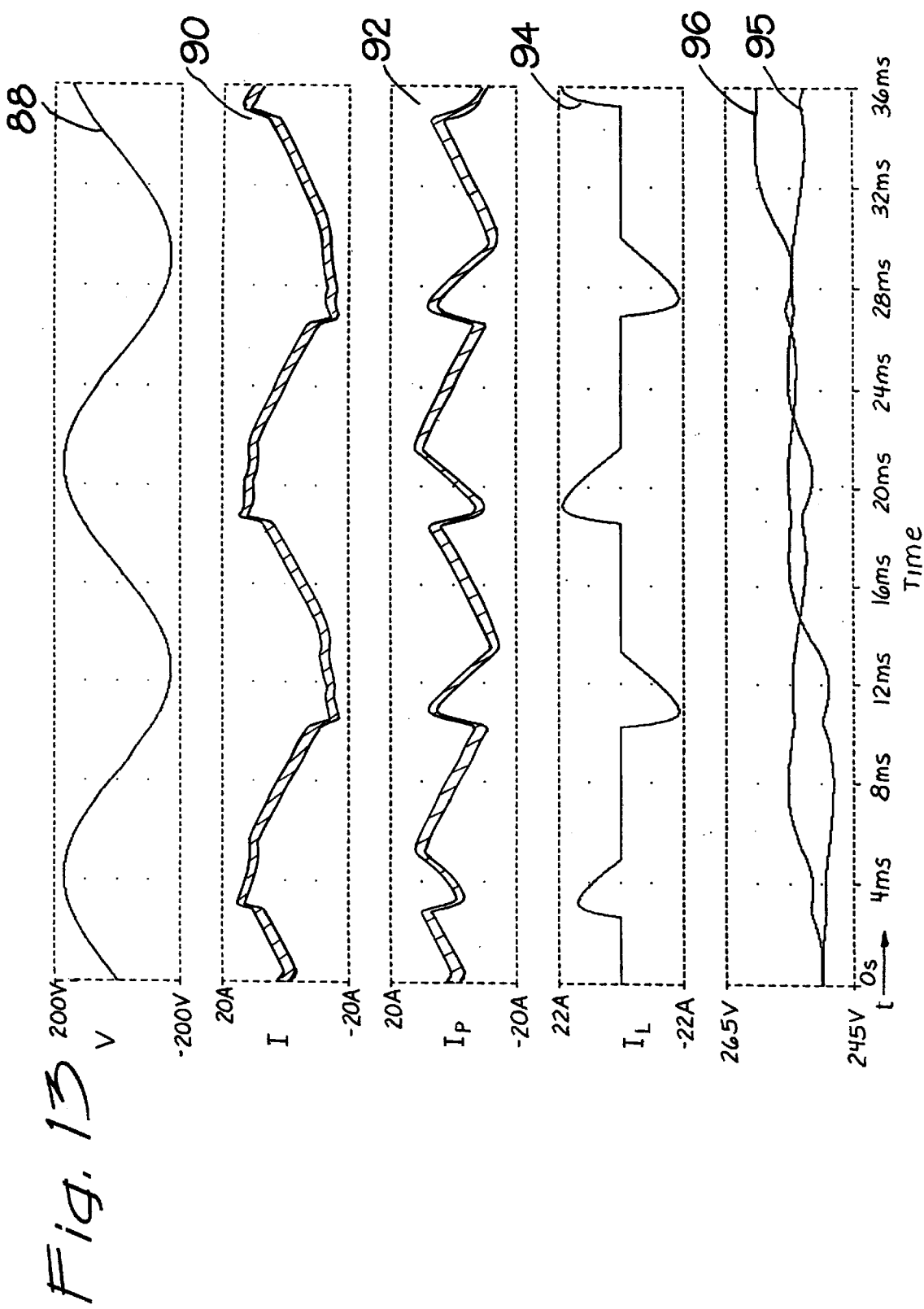
FIG. 13 is a graph of the simulation waveforms of the APF with a half bridge power stage as shown in FIG. 11(b).

FIG. 11(b) is half bridge power stage and FIG. 13 is simulation waveforms under the UCI control. The circuit of FIG. 11(b) use only two switches 16a and 16b and two corresponding capacitors 18a and 18b. However, the voltage stress on switches 16a and 16b is doubled compared to the full bridge switches, since each capacitor voltage in series should be higher than the peak of $v_s$. Therefore, the half bridge power stage is suitable only for low voltage systems.

FIG. 13 is a graph of the simulation waveforms of the APF with a half bridge power stage as shown in FIG. 11(b). The upper trace 88 is the line voltage. The second trace 90 from the top is the line current after compensated by the APF. The third trace 92 from the top is the output current of the APF. The fourth trace 94 from the top is the current of the nonlinear loads. The fifth and sixth traces 96 and 98 from the top are the capacitor voltages $v_{c1}$ and $v_{c2}$ respectively.

Furthermore, the proposed APF control strategy can be used in the DC side to compensate reactive and harmonic current in the DC side for the rectifier load as shown in FIG. 14. The input ac voltage $v_s$ is rectified by a diode bridge, generally denoted by reference numeral 100. The rectified dc voltage is vg=|vs|. The bidirectional DC/DC converter 102 is controlled according to the invention in the manner similar to that described above to generate a current $i_p$ that cancels the reactive and harmonic current of the load current $i_L$ into the nonlinear load, which is generically represented by a load resistance 104, a load capacitance 106, and a DC-DC or DC-AC converter 108. $R_s$ is the source resistance and $I_g$ the current from rectifier 100.

Figure 15:
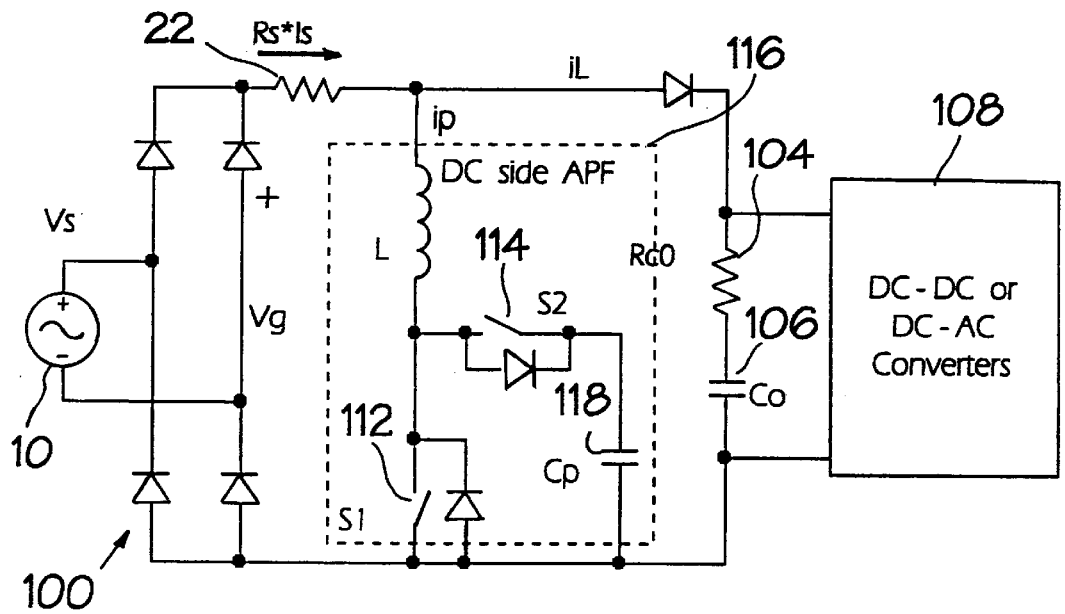
FIG. 15 is a schematic of a DC side APF bidirectional boost converter power stage or what is also called a shunt power factor correction circuit.
Figure 16:
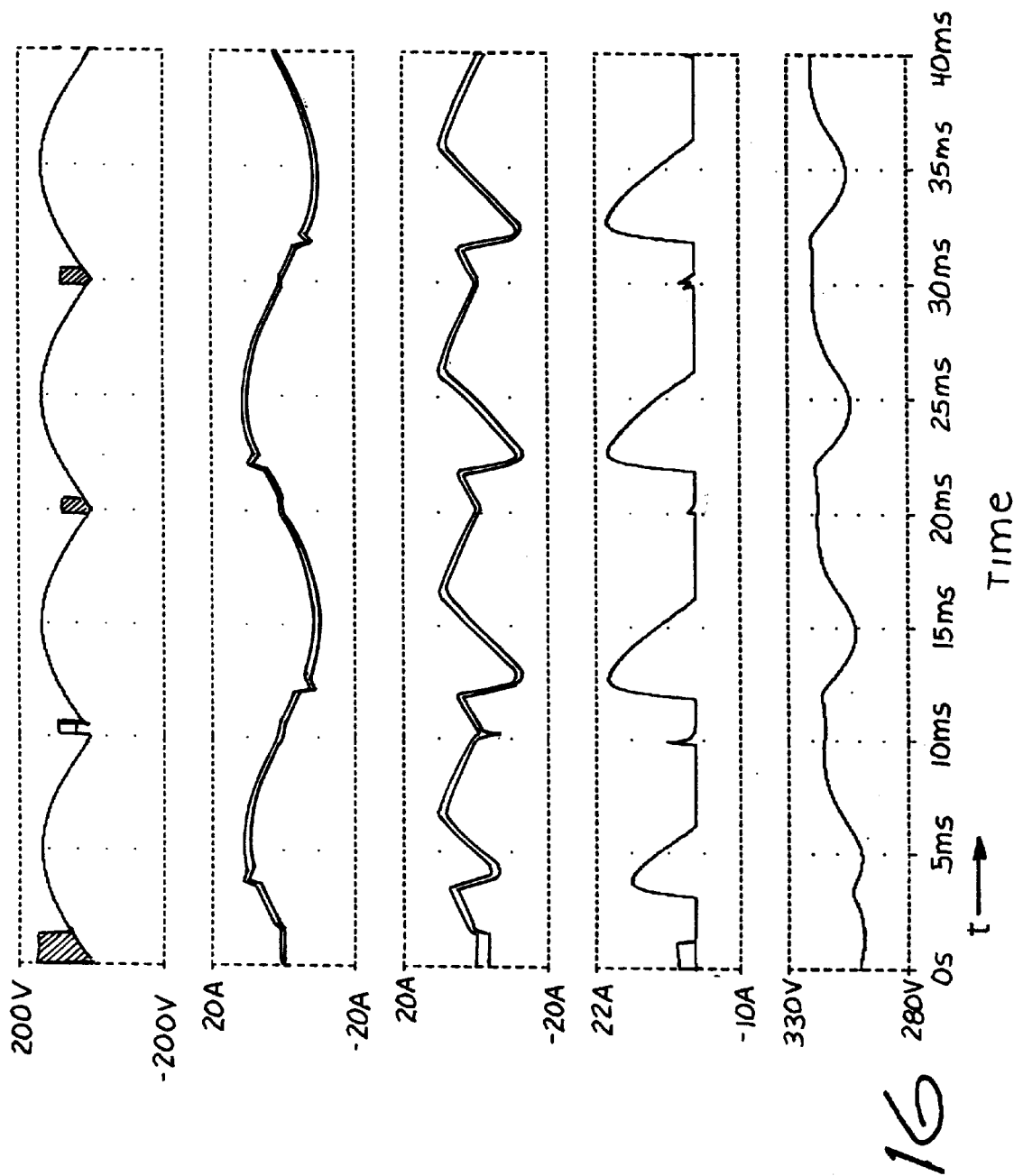
FIG. 16 is a graph of the simulation waveforms of the APF with a DC side APF operating with the control strategy of the invention. The upper trace is the line voltage. The second trace from the top is the line current after compensated by the APF. The third trace from the top is the output current of the APF. The fourth trace from the top is the current of the nonlinear loads.

FIG. 15 shows an example of DC side APF employing a two switch bidirectional boost converter 116 as the power stage. The switches 112, S1, and 114, S2, are turned on and off complementarily at a constant switching frequency. As a result, vcp=vg/(1−D) where $v_{cp}$ is the voltage across capacitor 118. The APF controller will realize the relation $i_g = v_g/Re$ using a one-cycle control circuit as describe above, where Re is an emulated resistor. The control function is expressed as shown in Table 2. The configuration can be viewed as a shunt power factor correction circuit. FIG. 16 shows the simulated waveforms of DC side APF employing the UCI APF control.

From the simulation results, it is found that the DC active power filter has smaller power rate, smaller size and higher converting efficiency than that of PFC circuit. Because the DC power active filter only processes the reactive and harmonic currents that is much smaller than that of the boost converter used as a current shaper. In addition, the control strategy can be extended to three-phase systems.

Table 2 shows the APF control equations and the relationship of $v_c$ and $v_s$ of various power circuits.

TABLE 2

Control Equations of Various Power Stages

|  | Full-bridge (FIG. 5 bipolar) | Full-bridge (FIG. 11 (a) unipolar) | Half-Bridge $<v_c> = <v_{c1}> = <v_{c2}>$ | DC side bidirectional boost |
|---|---|---|---|---|
| $v_c/v_s$ | 1/(1 − 2D) | 1/(1 − D) | 1/(1 − D) | 1/(1 − D) |
| Control equation | $2Dv_m =$ $v_m - R_s * i_s$ | $Dv_m =$ $v_m - R_s * i_s$ | $Dv_m =$ $v_m - R_s * i_s$ | $Dv_m =$ $v_m - R_s * i_s$ |

<v >, <v .> and <v > are the homologous average values of v , v , and v

Conclusion

In its simplest terms the control method of the invention is based on one cycle control to realize an APF function given by:

$$i_s = v_s/R_e$$

where $i_s$ is the source current, $v_s$ the source voltage and $R_e$ the equivalent resistance by which the source is loaded. Since $i_s = i_L + i_p$, the current $i_p$ generated by the APF will automatically cancel the reactive component of the nonlinear load current $i_L$.

Every converter can be described by:

$$v_c = v_s M(D),$$

where M(D) is a function of the duty cycle D, which is called the conversion ratio. The idea of the invention is to combine the two equations above so that the circuit realizes the performance described by:

$$i_s = [v_c/M(D)]/R_e.$$

If a current sensing resistor, $R_s$, is used to measure the source current, $i_s$, then the circuit performance can also be described by:

$$R_s i_s = [R_s v_c/M(D)]/R_e.$$

The control circuit shown in FIG. 4 can be used with any converter. The control circuit is comprised of an integrator 26 having an input $V_2$ with a reset circuit 28 having its output coupled to the input of a comparator 30. Comparator 30 has a second input $V_1$. The output of comparator 30 is then coupled to the input of a clocked flip-flop 32 whose output is then used to control the switches in the converter according to the teachings of the invention. In the beginning of each switching cycle, a constant frequency clock 36 sets the flip-flop 32 that determines the beginning of the on-pulse. The integrator integrates its input v2 until the integrated value reaches v1. Then the comparator 30 changes its state that resets the flip-flop 32, which then terminates the on-pulse. This process repeats from cycle to cycle. As shown in FIG. 4 the voltage- or current-energy storage element, shown in the illustrated embodiment as a capacitor, but also meant to include an inductor, is fed back and compared to a reference voltage, $v_{ref}$. The error, $v_e$, will be processed by a compensator, e.g. a proportional integration (PI) compensator, or equivalently by a P compensator or proportional integration-differential (PID) compensator, to generate a low frequency signal, $v_m$. This signal, $v_m$, is used in the control block:

$$R_s i_s = v_m/M(D)$$

to adjust the duty ratio, D, so that $i_s = v_s/R_e$ is approximately realized.

For example, in the preferred embodiment of FIG. 1, $v_c = v_s/[1-2D]$, so that $M(D)=1/[1-2D]$. The control condition then is expressed as $R_s i_s = v_m/M(D) = v_m(1-2D)$, which can be rewritten as $v_m - R_s i_s = 2 v_m D$. The control of the invention is then realized if the signal, $v_m - R_s i_s$, is connected to input $V_1$ of comparator 30 and the signal, 2 $v_m$ D, is connected to input $V_2$ of integrator 26 of FIG. 4. The result of this control will then be that $i_s$ will be set to be approximated to $v_s/R_e$.

As a further example, in the unipolar embodiment where $v_c = v_s/[1-D]$, so that $M(D)=1/[1-D]$, the control condition then is expressed as $R_s i_s = v_m/M(D) = v_m(1-D)$, which can be rewritten as $v_m - R_s i_s = v_m D$. The control of the invention is then realized if the signal, $v_m - R_s i_s$, is connected to input $V_1$ of comparator 30 and the signal, $v_m$ D, is connected to input $V_2$ of integrator 26 of FIG. 4. The result of this control will then again be that $i_s$ will be set to be approximated to $v_s/R_e$.

An unified constant-frequency integration (UCI) control of the active power filter is thus described above based on one-cycle control. This control method employs an integrator with reset as the component to control the duty ratio of an active power filter to realize net sinusoidal current draw from the ac source. Compared to previously proposed control methods, the UCI controller features simpler circuitry, no need for multipliers, no need for generating current references that reflect the reactive and harmonic portion of the load current, and no need to sense the load current and input voltage. Since the input current compensation is performed cycle by cycle, the compensated net current matches the input voltage closely, thus a unity power factor and low total harmonic distortion are achieved. Furthermore, since voltage across the energy storage capacitor is kept constant in the steady state, minimum current is generated by the APF to realize harmonic current cancellation.

Active power filters with UCI control can also damp the transient due to sudden changes in the load current. In the foregoing, the UCI control is used to control an active power filter employing a two level boost converter. Experimental result shows that the APF has excellent harmonic filtering capability demonstrated using many different nonlinear loads. This control method is applicable to most other APF topologies which are either parallel connected in the ac side or in the dc side. Active power filters with UCI controller provide a cost-effective and flexible solution for power quality control. Since the active power filter only processes the reactive and harmonic current, power losses and component rating should be lower compared to active power factor correcting methods. Due to the simplicity of the circuitry, it is very suitable for industrial production. For many existing nonlinear loads, unity power factor can be achieved by plugging an active filter to the ac inlet.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A circuit comprising:
    an AC source having a source current, $i_s$, and a source voltage, $v_s$;
    a nonlinear load coupled to said AC source having a reactive current drawn therefrom;
    a switching converter having a conversion ration M(D), where D is a duty ratio of said switching converter, and a voltage- or current-energy storage element, said switching converter being coupled to said AC source in parallel with said nonlinear load and configured so that it has a current draw opposite to said reactive current draw of said nonlinear load so that said reactive current draw of said nonlinear load is substantially cancelled out by said current draw of said switching converter; and
    a controller coupled to said switching converter to control performance of said switching converter so that said reactive current of said nonlinear load is substantially cancelled by current from said switching converter, which cancellation is indirectly performed by sensing said source current, $i_s$, and setting a control goal function to $i_s=v_s/R_e$, which in turn is approximately realized by adjusting said duty ratio, D, of said switching converter according to $R_e i_s=v_m/M(D)$, where $R_e$ is an equivalent resistance by which the source is loaded including said nonlinear load and where $v_m$ is a low frequency signal generated from said voltage- or current-energy storage element in said switching converter.

2. The circuit of claim 1 where said controller comprises an integrator operating in combination with a reset circuit, a comparator and a clocked flip-flop, said integrator having an input and an output coupled to a first input of said comparator, said comparator having a second input and an output, said output of said comparator coupled to an input of said clocked flip-flop, said clocked flip-flop having an output coupled to said switching converter by which said switching converter is switched so that $i_s=v_s/R_e$. As a result, the current generated by APF substantially cancels the reactive portion of the load current.

3. The circuit of claim 1 further comprising multiple nonlinear loads coupled to said AC source, said switching converter being coupled to said AC source in parallel with each of said nonlinear loads.

4. The circuit of claim 1 wherein said switching converter comprises a switched bridge circuit and a storage device coupled to said switched bridge circuit.

5. The circuit of claim 4 wherein said storage device is a capacitor.

6. The circuit of claim 4 wherein said switched bridge circuit is a switched full wave-bridge.

7. The circuit of claim 4 wherein said switched bridge circuit is a switched half wave-bridge.

8. The circuit of claim 4 wherein said switched bridge circuit is a switched DC/DC boost circuit in the DC side.

9. The circuit of claim 4 wherein said switched bridge circuit switches at a higher frequency than is characteristic of operation of said AC source and than said nonlinear load.

10. The circuit of claim 4 wherein said capacitor is configured to have a nearly constant voltage waveform across switching cycles.

11. The circuit of claim 9 wherein said capacitor is configured to have a nearly constant voltage waveform across switching cycles.

12. The circuit of claim 1 where said switching converter has a load capacitance with a voltage, $v_c$, thereacross and further comprising an integrator with a reset circuit having an input coupled to said switching converter, said integrator with said reset circuit having an output coupled to a comparator, said comparator having an output coupled to and controlling said switching converter, said integrator and comparator being each provided with inputs having a control signal such that the APF goal $R_s i_s = v_m/M(D)$ is realized.

13. The circuit of claim 12 wherein AC source is characterized by a waveform with a phase, wherein said nonlinear load has a fundamental active current, and wherein said integrator with said reset circuit is configured to control said switched bridge so that net current drawn from said AC source is equal to said fundamental active current drawn by said nonlinear load, and has substantially the same waveform and is in phase with said AC source.

14. The circuit of claim 1 wherein said switching converter comprises an AC to DC converter and a storage device coupled thereto having a control voltage, $v_c$, said AC to DC converter being switched at a frequency characterized by a duty cycle, D, said nonlinear load and said switching converter being characterizable as said equivalent resistance, $R_e$, coupled to said AC source, and further comprising a sensing resistor, $R_s$, being coupled in series with said equivalent resistance, $R_e$, and said AC source, wherein said duty cycle, D, is controlled according to a control equation so that reactive and harmonic current of said nonlinear load is substantially cancelled.

15. The circuit of claim 14 wherein said control equation is $2Dv_m = v_m - R_s * i_s$.

16. The circuit of claim 14 wherein said control equation is $Dv_m = v_m - R_s * i_s$.

17. The circuit of claim 14 wherein switching converter comprises an integrator with a reset circuit controlling switching of said AC to DC converter so that said reactive and harmonic current of said nonlinear load is substantially cancelled.

18. The circuit of claim 15 wherein said converter comprises a full wave bipolar converter.

19. The circuit of claim 16 wherein said converter comprises a full wave unipolar converter.

20. The circuit of claim 16 wherein said converter comprises a half wave converter.

21. The circuit of claim 16 wherein said converter comprises a current source converter.

22. A method of filtering an AC source having a nonlinear load coupled to said AC source having a voltage, $v_s$, and a current, $i_s$, drawn therefrom by use of a switching converter coupled to said AC source in parallel with said nonlinear load, comprising:

drawing reactive current with said nonlinear load; and controlling current drawn by said switching converter so that said current is opposite to said reactive current draw of said nonlinear load so that said reactive current draw of said nonlinear load is substantially cancelled out by said current draw of said switching converter, said switching converter being controlled so that performance of said switching converter causes $i_s = v_s R_e$, where $R_e$ is an equivalent resistance by which the source is loaded including said nonlinear load.

23. The method of claim 22 further comprising drawing reactive current with a multiple number of said nonlinear loads, and drawing current with said switching converter to compensate reactive current in said multiple nonlinear loads coupled to said AC source, said switching converter being coupled to said AC source in parallel with each of said nonlinear loads.

24. The method of claim 22 wherein drawing current with said switching converter comprises drawing current with a switched bridge circuit and with a storage device coupled to said switched bridge method.

25. The method of claim 24 wherein drawing current with said storage device comprising drawing current with a capacitor.

26. The method of claim 24 wherein drawing current with said switched bridge circuit comprises drawing current with a switched full wave-bridge.

27. The method of claim 24 wherein drawing current with said switched bridge method comprises drawing current with a switched half wave-bridge.

28. The method of claim 24 wherein drawing current with said switched bridge circuit comprises drawing current with a switched DC side directional boost circuit.

29. The method of claim 24 further comprising switching said switched bridge circuit at a higher frequency than is characteristic of operation of said AC source and than is characteristic of operation of said nonlinear load.

30. The method of claim 24 wherein drawing current with said capacitor is performed so as to have a nearly constant voltage waveform across switching cycles.

31. The method of claim 29 wherein drawing current with said capacitor is performed to have a nearly constant voltage waveform across switching cycles.

32. The method of claim 22 wherein drawing current with said switching converter further comprises sampling current drawn by said switching converter with an integrator having an input coupled to said switching converter, resetting said integrator with a reset circuit, generating control signals from said resetting of said integrator to control switching of said switching converter, and switching said switching converter so that so that $i_s = v_s R_e$ and said reactive current draw of said nonlinear load is substantially cancelled out by said current draw of said switching converter.

33. The method of claim 32 wherein AC source is characterized by a waveform with a phase, wherein said nonlinear load has a fundamental active current, and further comprising controlling said switched bridge with said integrator and said reset circuit so that net current drawn from said AC source by said switching converter is equal to said fundamental active current drawn by said nonlinear load, and has substantially the same waveform and is in phase with said AC source.

34. The method of claim 22 wherein drawing current with said switching converter comprises:

drawing current with an AC to DC converter and a storage device coupled thereto having a control voltage, $v_c$;

switching said AC to DC converter at a frequency characterized by a duty cycle, D, said nonlinear load and said switching converter being characterizable as said equivalent resistance, $R_e$, coupled to said AC source, and a sensing resistor, $R_s$, being coupled in series with said equivalent resistance, $R_e$, and said AC source; and controlling said duty cycle, D, according to $i_s = v_s/R_e$ so that reactive and harmonic current of said nonlinear load is substantially cancelled.

35. The method of claim 34 wherein controlling said duty cycle, D, according to $i_s = v_s/R_e$ controls said duty cycle, D, according to $2Dv_m = v_m - R_s i_s$.

36. The method of claim 34 wherein controlling said duty cycle, D, according to $i_s = v_s R_e$ controls said duty cycle, D, according to $Dv_m = v_m - R_s i_s$.

37. The method of claim 34 further comprising controlling switching of said AC to DC converter with an integrator with a reset circuit so that said reactive and harmonic current of said nonlinear load is substantially cancelled.

38. The method of claim 35 wherein switching said converter comprises switching a full wave bipolar converter.

39. The method of claim 36 wherein switching said converter comprises switching a full wave unipolar converter.

40. The method of claim 36 wherein switching said converter comprises switching a half wave converter.

41. The method of claim 36 wherein switching said converter comprises switching a current source converter.

* * * * *